(12) United States Patent
Scholz et al.

(10) Patent No.: US 8,722,838 B2
(45) Date of Patent: May 13, 2014

(54) SURFACE-MODIFIED, STRUCTURALLY MODIFIED FUMED SILICAS

(75) Inventors: Mario Scholz, Gruendau (DE); Juergen Meyer, Stockstadt (DE)

(73) Assignee: Evonik Degussa GmbH, Essen (DE)

( * ) Notice: Subject to any disclaimer, the term of this patent is extended or adjusted under 35 U.S.C. 154(b) by 208 days.

(21) Appl. No.: 12/442,633

(22) PCT Filed: Sep. 11, 2007

(86) PCT No.: PCT/EP2007/059533
§ 371 (c)(1),
(2), (4) Date: Mar. 24, 2009

(87) PCT Pub. No.: WO2008/043634
PCT Pub. Date: Apr. 17, 2008

(65) Prior Publication Data
US 2009/0292097 A1    Nov. 26, 2009

(30) Foreign Application Priority Data
Oct. 13, 2006    (DE) .......................... 10 2006 048 509

(51) Int. Cl.
*C08G 77/26*    (2006.01)
*C07F 7/02*    (2006.01)
*G03G 9/08*    (2006.01)
*B32B 19/02*    (2006.01)

(52) U.S. Cl.
USPC ............. 528/38; 556/420; 556/424; 556/413; 430/110; 430/119; 428/413; 428/446; 428/689

(58) Field of Classification Search
USPC ............. 528/38; 556/420, 424, 413; 430/119, 430/110, 10, 111; 428/421, 331, 413, 446, 428/689; 523/212, 213, 205; 524/262, 430, 524/447, 451, 494, 606
See application file for complete search history.

(56) References Cited

U.S. PATENT DOCUMENTS

| | | | | |
|---|---|---|---|---|
| 4,945,000 A | * | 7/1990 | Widmann et al. | 428/407 |
| 7,014,975 B2 | * | 3/2006 | Barthel et al. | 430/123.51 |
| 7,252,885 B2 | * | 8/2007 | Pickering et al. | 428/421 |
| 2003/0099895 A1 | | 5/2003 | Barthel et al. | |

FOREIGN PATENT DOCUMENTS

| | | | |
|---|---|---|---|
| DE | 196 16 781 | | 11/1997 |
| DE | 102 42 039 | | 4/2004 |
| EP | 1 304 332 | | 4/2003 |
| JP | 02-217863 | * | 8/1990 |
| JP | 10-87317 A | | 4/1998 |
| JP | 2001-328346 A | | 11/2001 |
| JP | 2003-201112 A | | 7/2003 |
| JP | 2005-37909 A | | 2/2005 |

OTHER PUBLICATIONS

Japanese Office Action issued Jun. 28, 2012 in Patent Application No. 2009-531801 Submitting English Translation Only.

\* cited by examiner

*Primary Examiner* — James J Seidleck
*Assistant Examiner* — S. Camilla Pourbohloul
(74) *Attorney, Agent, or Firm* — Oblon, Spivak, McClelland, Maier & Neustadt, L.L.P.

(57) ABSTRACT

Surface-modified, structurally modified fumed silicas Surface-modified, structurally modified fumed silicas are surface-modified with N-containing silicon compounds. They are used as fillers in resins and adhesives.

5 Claims, No Drawings

SURFACE-MODIFIED, STRUCTURALLY MODIFIED FUMED SILICAS

The invention relates to surface-modified, structurally modified fumed silicas, to a process for preparing them and to their use as a filler in resins which can be used in particular for producing adhesives.

Adhesives are known from Ullmann's Enzyklopädie der technischen Chemie, 4th Edition, Volume 14, page 227 (1997).

They consist of high-polymer compounds having extremely good strength properties. The majority of adhesives comprise high molecular mass organic compounds as base materials, or reactive organic compounds which are precursors of polymeric compounds and react to polymers in the course of the adhesive bonding operation.

It is known that for various adhesives, for example those based on epoxy resins, fumed silicas are very effective thixotroping agents in comparison to other silicas (Degussa Schriftenreihe Pigmente (2001) No. 27 and No. 54).

It is known practice to treat a fumed silica having a surface area of 200 $m^2$/g with hexamethyldisilazane before destructuring it (EP 0 808 880).

Disadvantageously, on account of the very good thixotroping effect, fumed silicas can be used only at a low concentration, since otherwise processability is no longer ensured.

This effect can be a significant disadvantage when high filling levels are desired, in order to enhance properties such as, for example, fracture toughness, impact toughness, scratch and abrasion resistance, contraction and thermal expansion, and thermal stability.

An objective is therefore to produce a filler for resins and adhesives with which the above disadvantage does not occur.

The invention provides surface-modified, structurally modified fumed silicas which are characterized in that the surface modification has been accomplished by means of N-containing silicon compounds.

The surface modification can be carried out by the silicas being if desired first sprayed with water and then with the surface modifier, which is at least one N-containing silicon compound. The water used may have been acidified with an acid, hydrochloric acid for example, to a pH of 7 to 1. If two or more surface modifiers are used, they can be applied together, but separately, in succession or as a mixture. The surface modifier or modifiers may be in solution in suitable solvents. When spraying is at an end, mixing may follow for a further 5 to 30 min.

The mixture is then thermally treated at a temperature of 20 to 400° C. over a period of 0.1 to 6 h. The thermal treatment may take place under inert gas, such as nitrogen, for example.

An alternative method of surface-modifying the silicas can be carried out by treating the silicas with the surface modifier, which is at least one N-containing silicon compound, in vapour form and then thermally treating the mixture at a temperature of 50 to 800° C. for a period of 0.1 to 6 h. The thermal treatment may take place under inert gas, such as nitrogen, for example.

The temperature treatment may also take place over a plurality of stages, at different temperatures.

The surface modifier or modifiers can be applied using single-fluid, two-fluid or ultrasonic nozzles.

The surface modification may be carried out batchwise or continuously in heatable mixers and driers having spraying facilities. Suitable apparatus may include, for example, the following: ploughshare mixers, plate driers, fluidized-bed driers or fluid-bed driers.

The structural modification of the silicas thus prepared is accomplished subsequently by means of mechanical action. Structural modification may if appropriate be followed by grinding. If appropriate, after the structural modification and/or grinding, a heat treatment may take place.

The structural modification may take place for example with a ball mill or with a continuously operating ball mill. Grinding may take place, for example, by means of an air-jet mill, toothed-disc mill or pinned-disc mill. Heat treatment may take place batchwise, in a drying oven, for example, or continuously, in a fluid bed or fluidized bed, for example. Heat treatment may take place under inert gas, nitrogen for example.

Use may be made of any fumed (pyrogenically prepared) silicas, examples being those set out in Table 1. From Table 1, the fumed silicas Aerosil 200, Aerosil 150 and Aerosil 300 are preferred. Particular preference is given to the fumed silica Aerosil 200, which has a BET surface area of 200±25 $m^2$/g.

TABLE 1

|  | AEROSIL® TT 600 | AEROSIL® 90 | AEROSIL® 130 | AEROSIL® 150 | AEROSIL® 200 | AEROSIL® 300 | AEROSIL® 380 | AEROSIL® OX50 |
|---|---|---|---|---|---|---|---|---|
| CAS reg. number | | | | 112945-52-5 (old No.: 7631-86-9) | | | | |
| Attitude to water | | | | hydrophilic | | | | |
| Appearance | | | | loose white powder | | | | |
| BET[1] surface area $m^2$/g | 200 ± 50 | 90 ± 15 | 130 ± 25 | 150 ± 15 | 200 ± 25 | 300 ± 30 | 380 ± 30 | 50 ± 15 |
| Average primary particle size mm | 40 | 20 | 16 | 14 | 12 | 7 | 7 | 40 |
| Tapped density[2] | | | | | | | | |
| Standard product g/l | about 60 | about 80 | about 50 | about 50 | about 50 | about 50 | about 50 | about 130 |
| Compacted product g/l (addition of "C") | — | — | about 120 | about 120 | about 120 | about 120 | about 120 | — |
| Loss on drying[3] (2 h at 105° C.) % on leaving supply plant | <2.5 | <1.0 | <1.5 | <0.5[9] | <1.5 | <1.5 | <2.0 | <1.5 |
| Loss on ignition[4)7] (2 h at 1000° C.) % | <2.5 | <1 | <1 | <1 | <1 | <2 | <2.5 | <1 |
| pH[5] (in 4% aqueous dispersion) | 3.6-4.5 | 3.7-4.7 | 3.7-4.7 | 3.7-4.7 | 3.7-4.7 | 3.7-4.7 | 3.7-4.7 | 3.6-4.3 |
| $SiO_2$[8] % | >99.8 | >99.8 | >99.8 | >99.8 | >99.8 | >99.8 | >99.8 | >99.8 |
| $Al_2O_3$[8] % | <0.05 | <0.05 | <0.05 | <0.05 | <0.05 | <0.05 | <0.05 | <0.08 |
| $Fe_2O_3$[8] % | <0.003 | <0.003 | <0.003 | <0.003 | <0.003 | <0.003 | <0.003 | <0.01 |
| $TiO_2$[8] % | <0.03 | <0.03 | <0.03 | <0.03 | <0.03 | <0.03 | <0.03 | <0.03 |
| HCl[8)10] % | <0.025 | <0.025 | <0.025 | <0.025 | <0.025 | <0.025 | <0.025 | <0.025 |

TABLE 1-continued

| | AEROSIL® TT 600 | AEROSIL® 90 | AEROSIL® 130 | AEROSIL® 150 | AEROSIL® 200 | AEROSIL® 300 | AEROSIL® 380 | AEROSIL® OX50 |
|---|---|---|---|---|---|---|---|---|
| Sieve residue[6] (Mocker method, 45 μm) % | <0.05 | <0.05 | <0.05 | <0.05 | <0.05 | <0.05 | <0.05 | <0.02 |

[1] based on DIN 66131
[2] based on DIN ISO 787/XI, JIS K 5101/18 (unsieved)
[3] based on DIN ISO 787/II, ASTM D 280, JIS K 5101/21
[4] based on DIN 55921, ASTM D 1208, JIS K 5101/23
[5] based on DIN ISO 787/IX, ASTM D 1208, JIS K 5101/24
[6] based on DIN ISO 787/XVIII, JIS K 5101/20
[7] based on the substance dried at 105° C. for 2 hours
[8] based on the substance calcined at 1000° C. for 2 hours
[10] HCl content in constituent from loss on ignition Surface modifiers which can be used include the individual surface modifiers from the following list, and also mixtures of these surface modifiers.

a) Organosilanes of type $(RO)_3Si(CH_2)_m$—R'
  R=alkyl, such as methyl-, ethyl-, propyl-
  m=0.1-20
  R'=—$NH_2$,
    —NH—$CH_2$—$CH_2$—$NH_2$,
    —N—($CH_2$—$CH_2$—$NH_2$)$_2$
    —NH—CO—N—CO—($CH_2$)$_5$,
    —NH—COO—$CH_3$,
    —NH—COO—$CH_2$—$CH_3$,
    —NH—($CH_2$)$_3$Si(OR)$_3$,
    —NH—($CH_2$)$_3$—$CH_3$,
    —NH—$CH_2$—$CH_2$—NH—$CH_2$—$CH_2$—$NH_2$ b) Organosilanes of type $(R'')_x(RO)_ySi(CH_2)_m$—R'
  R=alkyl, such as methyl-, ethyl-, propyl-
  R''=alkyl, cycloalkyl
  x+y=3,
  x=1, 2
  y=1, 2
  R'=—$NH_2$,
    —NH—$CH_2$—$CH_2$—$NH_2$,
    —N—($CH_2$—$CH_2$—$NH_2$)$_2$
    —NH—CO—N—CO—($CH_2$)$_5$,
    —NH—COO—$CH_3$,
    —NH—COO—$CH_2$—$CH_3$,
    —NH—($CH_2$)$_3$Si(OR)$_3$,
    —NH—($CH_2$)$_3$—$CH_3$,
    —NH—$CH_2$—$CH_2$—NH—$CH_2$—$CH_2$—$NH_2$ c) Haloorganosilanes of type $X_3Si(CH_2)_m$—R'
  X=Cl, Br
  m=0.1-20
  R'=—$NH_2$,
    —NH—$CH_2$—$CH_2$—$NH_2$,
    —N—($CH_2$—$CH_2$—$NH_2$)$_2$
    —NH—CO—N—CO—($CH_2$)$_5$,
    —NH—COO—$CH_3$,
    —NH—COO—$CH_2$—$CH_3$,
    —NH—($CH_2$)$_3$Si(OR)$_3$,
    —NH—($CH_2$)$_3$—$CH_3$,
    —NH—$CH_2$—$CH_2$—NH—$CH_2$—$CH_2$—$NH_2$ d) Haloorganosilanes of type $(R)_zX_ySi(CH_2)_m$—R'
  X=Cl, Br
  z+y=3,
  z=1, 2
  y=1, 2
  R=alkyl, cycloalkyl
  m=0.1-20
  R'=—$NH_2$,
    —NH—$CH_2$—$CH_2$—$NH_2$,
    —N—($CH_2$—$CH_2$—$NH_2$)$_2$
    —NH—CO—N—CO—($CH_2$)$_5$,
    —NH—COO—$CH_3$,
    —NH—COO—$CH_2$—$CH_3$,
    —NH—($CH_2$)$_3$Si(OR)$_3$,
    —NH—($CH_2$)$_3$—$CH_3$,
    —NH—$CH_2$—$CH_2$—NH—$CH_2$—$CH_2$—$NH_2$ Surface modifiers which can be used with preference are aminopropyltriethoxysilane, aminopropyltrimethoxysilane, N-(2-aminoethyl)-3-aminopropylmethyldimethoxysilane and 3-aminopropylmethyldiethoxysilane. Surface modifiers which can be used with particular preference are aminopropyltriethoxysilane and aminopropyltrimethoxysilane.

Particular preference is given to the aminopropyltriethoxysilane-treated or aminopropyltrimethoxysilane-treated Aerosil 200, preference being given in turn to the aminopropyltriethoxysilane-treated Aerosil 200 (fumed silica having a BET surface area of 200±25 m$^2$/g).

Excluded from consideration as a surface modifier is hexamethyldisilazane (HMDS).

The invention further provides resins which are characterized in that they comprise structurally modified fumed silicas surface-modified with N-containing silanes. These resins can be used for preparing adhesives.

The invention relates in particular to adhesives based on epoxy resins, unsaturated polyester resins, polyurethane, silane-terminated polymers, vinyl ester resins, acrylates, polyvinyl acetate, polyvinyl alcohol, polyvinyl ethers, ethylene-vinyl acetate, ethylene-acrylic acid copolymers, polyvinyl acetates, polystyrene, polyvinyl chloride, styrene-butadiene rubber, chloroprene rubber, nitrile rubber, butyl rubber, polysulfide, polyethylene, polypropylene, fluorinated hydrocarbons, polyamides, saturated polyesters and copolyesters, phenol-formaldehyde resins, cresol-/resorcinol-formaldehyde resins, urea-formaldehyde resins, melamine-formaldehyde resins, polyimides, polybenzimidazoles, polysulphones, which are characterized in that they contain up to 40% by weight, based on the total masses, of a structurally modified silica modified with N-containing silanes.

One preferred subject of the invention may be an epoxy resin-based casting composition comprising the silica modified with N-containing silanes. The resins of the invention can be put to diverse uses, as for example in adhesives.

Possible adhesives include the following:
Non-metallic substances which are able to join adherends by two-dimensional attachment and internal strength (adhesion and cohesion). Adhesives, accordingly, are products which, in accordance with their respective chemical composition and the physical state prevailing at the time of application to the adherends, allow wetting of the surfaces and, in their bonded joint, form the adhesive layer needed for transmission of force between the adherends. Like sealants, adhesives comprise similar components as well as the base polymer, such as, for example, solvents (ketones for example), water, fillers (chalk for example), thixotroping agents (fumed silica for example), adhesion promoters (silanes for example), colour pastes (pigment-grade carbon black for example) and also further additives (for example catalysts, ageing inhibitors).

In comparison to sealants, adhesives have higher tensile shear strengths and lower extension values; in other words, adhesives are hard to elastic, and sealants are elastic to plastic.

Possible epoxy resins include the following:

Epoxy resins are prepared for example by condensing 2,2-bis(4-hydroxyphenyl)propane, also called bisphenol A, and epichlorohydrin in a basic medium. Depending on the equivalents of both reactants that are employed, the products are glycidyl ethers with different molar masses. In recent years, epoxy resins from bisphenol F, novolak epoxy resins, and cycloaliphatic and heterocyclic epoxy resins have also acquired importance.

Since epoxy resins on their own are poor film formers, molecular enlargement is required by means of suitable crosslinking agents. Examples of crosslinking agents used for epoxy resins include polyamines, polyaminoamides, carboxylic anhydrides and dicyandiamides. Among the amine curing agents a distinction is made between aliphatic, cycloaliphatic, aromatic and araliphatic polyamines. Curing takes place without elimination of reaction products. It generally involves the addition of a reactive hydrogen atom to the epoxide group, with formation of a hydroxyl group.

Possible unsaturated polyester resins include the following:

They are obtained by polycondensation of unsaturated and saturated dicarboxylic or polycarboxylic acids with alcohols. Given a suitable reaction regime, the double bonds remain in the acid and/or alcohol and permit reactions with unsaturated monomers, styrene for example, in accordance with the principle of addition polymerization.

Unsaturated dicarboxylic acids used are as follows: maleic anhydride, maleic acid, fumaric acid.

Saturated dicarboxylic acids:

ortho-phthalic acid and ortho-phthalic anhydride, isophthalic acid, terephthalic acid, tetrahydrophthalic acid, hexahydrophthalic acid, adipic acid, azelaic acid, sebacic acid, Het acid, tetrabromophthalic acid Glycols used are as follows:

propylene 1,2-glycol, ethylene glycol, butylene glycol, neopentyl glycol, 2,2,4-trimethylpentane-1,3-diol, dibromoneopentyl glycol, diethylene glycol, triethylene glycol, dipropylene glycol, pentaerythritol diallyl ether, dicylcopentadiene Monomers for the crosslinking:

styrene, alpha-methylstyrene, meta- and para-methylstyrene, methyl methacrylate, diallyl phthalate, triallyl cyanurate This listing does not exhaust the number of possible starting materials; the skilled person will be able, depending on the raw material situation, to use other compounds as well. Furthermore, the addition of dicyclopentadiene is customary, and the reactivity of the resins is modified as a result. The "unsaturated polyester resins" produced can be used as such or in dilution with reactive monomers. Reactive monomers are styrene, stilbene, esters of acrylic acid, esters of methacrylic acid, diallyl phthalate, and other unsaturated compounds, provided that they have a sufficiently low viscosity and adequate miscibility with the unsaturated polyester resin.

Possible polyurethane resins include the following:

The polyurethanes, also called polyisocyanate resins, derive from isocyanic acid. As an extremely reactive compound, it undergoes addition very readily with compounds which possess an active (mobile) hydrogen atom. In the course of this reaction the double bond between the nitrogen and the carbon is cleaved, the active hydrogen becoming attached to the nitrogen and the R2-O group to the carbon, to form a urethane group. In order to obtain higher molecular mass crosslinked polyurethanes of the kind needed for adhesive and sealant layers, it is necessary to provide reaction partners which are starting products having at least two functional groups, such as di- or triisocyanates, for example diphenylmethane 4,4-diisocyanate (MDI) with polymeric fractions, or reaction product of tolylene diisocyanate (TDI) and polyols, and polyhydric alcohols (diols or polyols, compounds having two or more hydroxyl functions in the molecule). Alcohols of this kind may also be present, for example, in the form of saturated polyesters, which are prepared with an excess of polyalcohols.

Two-component reactive adhesives are composed of a low molecular mass polyisocyanate and a likewise relatively low molecular mass polyesterpolyol, for example polyalkylene polyadipate. Following the combining of the two components, urethane groups are formed in the adhesive or in the adhesive layer.

One-component reactive adhesives are composed of a relatively high molecular mass polyisocyanate-polyurethane, which sets by reacting with atmospheric moisture. In principle the situation here as well is one of two inter-reacting chemical components, but only one physical component is supplied for adhesive processing. Since, on reaction with moisture, the simple low molecular mass polyisocyanates form relatively hard and brittle adhesive layers with low strength values, the one-component systems start from pre-crosslinked polymers, known as prepolymers. These compounds are prepared from relatively high molecular mass polyols with a stoichiometric excess of isocyanate. In this way, the compounds present already possess urethane bonds, but in addition possess reactive isocyanate groups as well, which are amenable to the reaction with moisture. The reaction with water proceeds with the formation of a urea bond. The primary amines formed in the course of the decomposition reaction react immediately with further isocyanate groups to form polyureas. In the case of the one-component systems, therefore, the fully cured polymer contains not only urethane compounds but also urea compounds.

Solvent-borne polyurethane adhesives are available as physically setting systems and as chemically reacting systems. In the case of the physically setting systems the polymer takes the form of a high molecular mass hydroxyl polyurethane, the solvent used being, for example, methyl ethyl ketone. The chemically reacting systems include, further to the hydroxyl polyurethane, a polyisocyanate as crosslinker and as a second component.

Dispersion-based adhesives comprise a high molecular mass polyurethane in dispersion in water.

In the case of thermally activable polyurethane adhesives the isocyanate component is in "capped" or "blocked" form in a compound which eliminates the isocyanate component only at a relatively high temperature.

Reactive polyurethane hotmelt adhesives are prepared by using relatively high molecular mass, crystallizing and meltable diol and isocyanate components. These components are applied as hotmelt adhesives at temperatures from around 70° C. to 120° C. to the adherends. After cooling (physically setting) the bond acquires a sufficient initial strength, which allows rapid further processing. Subsequently, as a result of additional moisture exposure of the reactive isocyanate groups still present, crosslinking then takes place via urea bonds (chemical reaction), to form the adhesive layer polymer.

Possible silane-terminated polymers include the following:

The term "silane-terminated polymers" or else "silane-modified polymers" embraces all of those prepolymers which, either at the chain ends or pendently, carry silyl groups having at least one hydrolysable bond, but whose polymer backbone does not contain the siloxane bond $(SiR_2O)_n$ typical of silicones.

In general it can be assumed that any silane-modified polymer, irrespective of its chemical structure, will have the qualities of a hybrid: the curing is similar to that of the silicones, and the other properties are shaped by the various possible polymer backbones between the silyl groups. Silane-terminated or silane-modified polymers can be classed in terms of their structure between the polyurethanes and the silicones.

The synthesis of the silane-modified polymers encompasses a number of stages. The initial basis is dihydric or trihydric polyoxypropylene glycol, which is converted into the corresponding bisallyl compound. That compound is reacted to form the desired end product, bis(3-(methyldimethoxysilyl)propyl)polyoxypropylene.

The silyl groups thereby introduced into the chains crosslink via mechanisms of the kind known in silicone chemistry, i.e., with elimination of small amounts of water or methanol, and so give an elastic and insoluble network.

There are further possible methods of obtaining sealants and adhesives based on silicone-modified polymers: for example, the reaction of NCO-terminated prepolymers with correspondingly reactive aminosilanes or mercaptosilanes to form the desired compounds. The polymer backbone may contain all of the conceivable rational structural elements, such as ether, ester, thioether or disulphide bridges. The converse case, in which an $NH_2$—, SH—, or OH-terminated prepolymer can be reacted with an isocyanate silane, is likewise conceivable. The addition of terminal mercapto groups (either in the prepolymer or in the silane) to C—C double bonds offers a further route of technical interest.

Possible vinyl resins include the following:

On the chemical side, vinyl ester resins possess a certain relationship to the UP resins, in particular as far as curing reaction, processing technology and field of use are concerned. These resins are polyadducts of liquid epoxy resins and acrylic acid. As a result of reduction of ester groups in the molecule chain, these resins have better hydrolysis resistance in tandem with effective elasticity and impact toughness. Monomers used for crosslinking are the same as for the unsaturated polyester resins, styrene in particular.

Possible acrylates include the following:

The collective term "acrylate-based adhesives" encompasses all of the reactive adhesives whose curing takes place via the carbon-carbon double bond of the acrylic group.

Particular significance in adhesive formulations has been acquired by the methacrylic esters and the alpha-cyanoacrylic esters. The curing of the acrylate adhesives is accomplished by addition polymerization, in the course of which an initiator triggers a chain reaction leading to a continuous concatenation of molecules (monomers) via the carbon double bond, to give the cured adhesive. The polymerization of the "acrylate" adhesives can be initiated by means of free radicals (free-radical polymerization), or alternatively, in the case of the alpha-cyanoacrylates, by means of anions (anionic polymerization). In accordance with the polymerization mechanism that is utilized for curing, the acrylate adhesives are also subdivided into the following groups:

anionically curing adhesives: alpha-cyanoacrylate 1-component adhesives free-radically curing adhesives: anaerobic 1-component adhesives free-radically curing adhesives: 2-component adhesives In the case of the sealants based on polyacrylic esters or acrylic ester copolymers and polymethacrylic esters a distinction is made between solvent-borne and aqueous systems. Polyacrylate sealants cure physically by evaporation of the solvent or of the dispersion water.

Possible polyvinyl acetates include the following:

Polyvinyl acetate is the product of polymerization of vinyl acetate. Owing to the strongly polar acetate group present in the molecule, polyvinyl acetate possesses very good adhesion properties to many adherend surfaces. Use is predominantly as a dispersion-based adhesive with a solids content of approximately 50% to 60%, in some cases also based on vinyl acetate copolymers (with vinyl chloride, for example).

Possible polyvinyl alcohols include the following:

Polyvinyl alcohol comes about as a product of hydrolysis of polyvinyl acetate and other similar polyesters. Depending on molecular weight, the polyvinyl alcohol takes the form of a liquid having a more or less high viscosity. It is used, for example, for bonding cellulosic materials, such as paper, cardboard, wood, etc., for example, and also as a protective colloid for stabilizing and increasing the setting rate of dispersion-based adhesives.

Possible polyvinyl ethers include the following:

Among the polyvinyl ethers, the following three polymers in particular are of interest as base materials for adhesive:

polyvinyl methyl ethers polyvinyl ethyl ethers polyvinyl isobutyl ethers

The polyvinyl ethers at moderate degrees of polymerization are tacky plasticizing resins possessed of very good adhesion properties to porous and smooth surfaces. Polyvinyl methyl ether is notable in particular for the fact that, owing to its water of solubility, it can be moistened again and therefore, for example, as a mixture with dextrin or animal glues, used as a gum on label papers, endows them with improved adhesion. On account of their permanent tackiness, polyvinyl ethers are also employed in pressure-sensitive adhesives.

Possible ethylene-vinyl acetates include the following:

Copolymer of ethylene and vinyl acetate. In the molecular structure the vinyl acetate molecules are incorporated randomly in the ethylene chain. While the elimination of acetic acid makes the polyvinyl acetate relative unstable under temperature load, the copolymers with ethylene are significantly more resistant in terms of oxidation and thermal degradation. For this reason, EVA copolymers (with an approximately 40% vinyl acetate fraction) are among an important group of base hotmelt adhesive materials.

Possible ethylene-acrylic acid copolymers include the following:

Copolymers of ethylene and of acrylic acid and/or acrylic esters.

These copolymers, which combine the chemical resistance of polyethylene with the good properties of the acid and/or ester moiety, represent important base polymers for hotmelt adhesives. The ester component used is preferably ethyl acrylate.

Possible vinylacetals include the following:

Polyvinylacetals, come about through the action of aldehydes on alcohols. The most important acetals for adhesives' manufacture are
polyvinylformal
polyvinylbutyral.

Both serve as a plasticizing component for phenolic resin-based adhesives; polyvinylbutyral, moreover, finds application as an adhesive film in laminated safety glass.

Possible polystyrene may include the following:

Polymerization product of styrene.

The monomer (monostyrene) is in use as a constituent for adhesive base materials predominantly in two sectors:
- as a copolymer with plasticizing monomers, particularly butadiene, for the preparation of styrene-butadiene dispersions;
- as a "polymerizable" solvent for copolymerization with unsaturated polyesters.

Possible polyvinyl chloride includes the following:

Polyvinyl chloride is the polymerization product of vinyl chloride.

It is used as a base material particularly for plastisol adhesives, and also as a copolymer with vinyl acetate to give vinyl chloride/vinyl acetate copolymers in solvent-based adhesives, dispersion-based adhesives, heat-sealing adhesives, and as a high-frequency welding assistant.

Possible styrene-butadiene rubber includes the following:

Styrene-butadiene rubber is a typical example of a thermoplastic elastomer, combining the application properties of elastomers with those of thermoplastics. The styrene-butadiene copolymer (SBS) and the styrene-isoprene copolymer (SIS) are what are called triblock copolymers, constructed linearly of successive identical monomer units in individual blocks. The end blocks are polystyrene segments, while the middle block is polybutadiene (styrene-butadiene-styrene block copolymer, SBS) or else isoprene (styrene-isoprene-styrene block polymer, SIS).

The proportion of styrene to butadiene (isoprene) fraction is approximately 1:3. Unlike adhesive layer polymers which owe their elastic properties to the addition of plasticizer, in this way an "internal plasticizing" is achieved. A particular advantage of these rubber copolymers is their ability to form adhesive layers having good adhesion properties and high flexibility. Significant application therefore exists in situations where the adhesively bonded adherends are subject in practical use to high deformation stresses, such as in footwear or with rubber/rubber or rubber/metal bonds, for example.

Possible chloroprene rubber (CR) includes the following:

Chloroprene rubber (polychloroprene) comes about as a polymerization product and copolymerization product of chloroprene (2-chlorobutadiene). Besides the good adhesion properties, the linear macromolecules possess a strong propensity towards crystallization, which contributes to a relatively high strength on the part of the adhesive layer. These polymers and copolymers are important base materials for contact adhesives. The double bond present within the polychloroprene molecule allows additional crosslinking to be carried out with correspondingly reactive molecule groups. Thermosetting components used for this purpose include isocyanates and phenolic resins.

In the case of polychloroprene lattices the base polymers are dispersed in aqueous phase with the corresponding additives (tackifying resins, etc.) by means of suitable emulsifiers and/or protective colloids.

Possible nitrile rubber (NBR) includes the following:

Nitrile rubber is a copolymer of butadiene with a fraction of approximately 20% to 40% of acrylonitrile. The high acrylonitrile fraction endows these polymers with effective plasticizer resistance, so making them highly suitable, for example, for the bonding of plasticized plastics.

Possible butyl rubber includes the following:

Butyl rubber is a copolymer composed of a predominant fraction (<97%) of isobutylene with isoprene (<5%). Within this linear chain molecule there exist, in the form of the long polyisobutylene segments, very high chain fractions of saturated character, at which no further crosslinking is possible. The sole crosslinkable component is the isoprene molecule, and so the overall properties of the butyl rubber are determined by the fraction of the number of double bonds, predetermined by the isoprene.

The reactivity can be further influenced by incorporation of monomers containing chlorine or bromine.

Possible polysulphide includes the following:

Raw materials for polysulphide sealants have long been known under the trade name Thiokol®. Polysulphide polymers are obtained by reacting dichloroethylformal with sodium polysulphide.

The molecular weight of the liquid polymers is between 3000 and 4000. By reaction with an oxidizing agent, manganese dioxide for example, they can be converted into an ultimate rubber-elastic state.

Possible polyethylene includes the following:

Prepared as a polymerization product of ethylene. The low molecular mass types, with melt indices in the range from 2 to 2000 g/10 min, have found use, in combination with tackifying resins and microwaxes, as hotmelt adhesives in the paper and cardboard industry.

Possible polypropylene includes the following:

Prepared as a polymerization product of propylene.

Polypropylene is in use as a base material for hotmelt adhesives with moderate strength properties, more specifically in the form of atactic polypropylene.

Possible fluorinated hydrocarbons include the following:

Polyfluoro-ethylene-propylene is a copolymer of tetrafluoroethylene and hexafluoropropylene and has been studied as a base material for hotmelt adhesives. The advantage of these products lies in the high long-term temperature durability.

Possible polyamides include the following:

The polyamides represent some of the most important base materials for the physically setting hotmelt adhesives. Suitable for the preparation of the polyamides are the reactions described below, which typically take place in the melt under a nitrogen atmosphere:
polycondensation of diamines with dicarboxylic acids
polycondensation of aminocarboxylic acids
polycondensation from lactams
polycondensation of diamines with dimerized fatty acids Possible saturated polyesters and copolyesters include the following:

Saturated polyesters and copolyesters come about through polycondensation from dicarboxylic acids and diols. They are an important base material for hotmelt adhesives.

Possible phenol-formaldehyde resins include the following:

These polymers come about through a polycondensation reaction between phenol and formaldehyde, forming highly crosslinked phenolic resins which are used as a base material for adhesives for—for example—aircraft construction. Pure phenol-formaldehyde resins are generally too brittle. For this reason they are modified with thermoplastic polymers by copolymerization or cocondensation, for example with:
polyvinylformal
polyvinylbutyral
elastomers, for example polychloroprene and nitrile rubber
polyamides
epoxy resins Possible cresol-/resorcinol-formaldehyde resins include the following:

Besides phenol as a starting monomer for formaldehyde condensations, use is also made of phenol derivatives, such as cresols and resorcinol, as co-reactants.

Possible urea-formaldehyde resins include the following:

A large number of nitrogen-containing organic compounds are capable of polycondensation with aldehydes. For application as adhesives, urea and melamine in particular have acquired importance. With the urea-formaldehyde resins the reaction sequence takes place initially in the form of an addition reaction in weakly acidic solution. The actual polycondensation reaction, leading to the formation of the polymeric adhesive layer, results in highly crosslinked polymers via the formation either of an ether bridge or of a methylene bridge.

Possible melamine-formaldehyde resins including the following:

Like urea, melamine as well reacts with formaldehyde to form methylol compounds. As in the case of the urea reactions, the polycondensation with these compounds too proceeds via methylene or methylene ether linkages to form high molecular mass, highly crosslinked, hard and in some cases brittle adhesive layers.

Possible polyimides include the following:

The experiments on the use of the polyimides arise out of the concern to have organically based adhesives available for high temperature challenges.

The preparation of technically utilizable polyimides is accomplished by reaction of the anhydrides of tetrabasic acids, for example pyromellitic anhydride, with aromatic diamines, for example diaminodiphenyl oxide. Use as an adhesive is accomplished starting from a precondensate, in the form of solutions or films.

Possible polybenzimidazoles include the following:

The polybenzimidazoles are likewise to be classed as adhesives of high heat resistance. They come about through a polycondensation reaction from aromatic tetramines with dicarboxylic acids.

Possible polysulphones include the following:

The polysulphones likewise belong to the group of heat-resistant adhesives. They are obtained, for example, through a polycondensation reaction from dihydroxydiphenyl sulphone with bisphenol A.

In accordance with the invention it is surprising that, with relatively rapid incorporability, the above-described silicas of the invention can be incorporated with high fill levels, without disadvantages, into epoxy resins, and the viscosity can be kept at a low level.

The applications of the highly filled, low-viscosity adhesives of the invention are, for example, casting compositions, which can be used in coatings in the electrical and electronics sectors.

EXAMPLES

Preparation of Surface-Modified and Structurally Modified Silicas

| | | | Surface modification | | | | Structural modification | |
|---|---|---|---|---|---|---|---|---|
| | | | Parts of SuM*/100 | Parts of $H_2O$/100 | Heat treatment | Heat treatment | | |
| Example | Oxide | SuM* | parts of oxide | parts of oxide | temperature [° C.] | time [h] | Structural modification | Grinding*** |
| Comparative example | | | | | | | no | no |
| 1 | AEROSIL ® 200 | C | 16 | 5 | 130 | 2 | yes | no |
| 2 | AEROSIL ® 200 | D | 19 | 5 | 130 | 2 | yes | no |
| 3 | AEROSIL ® 200 | A | 15 | 3 | 120 | 4 | yes | no |
| 4 | AEROSIL ® 200 | B | 10 | 3 | 120 | 3 | yes | no |
| 5 | AEROSIL ® 200 | B | 18 | 5 | 130 | 3 | yes | no |
| 6 | AEROSIL ® 150 | C | 12 | 3 | 120 | 3 | yes | no |
| 7 | AEROSIL ® 300 | A | 23 | 5 | 130 | 4 | yes | no |
| 8 | AEROSIL ® 200 | A | 15 | 3 | 120 | 4 | yes | AJ |
| 9 | AEROSIL ® 200 | B | 18 | 5 | 130 | 3 | yes | AJ |
| 10 | AEROSIL ® 150 | C | 12 | 3 | 120 | 3 | yes | TM |
| 11 | AEROSIL ® 300 | A | 23 | 5 | 130 | 4 | yes | AJ |

SuM* = Surface modifier:
A = Aminopropyltriethoxysilane
B = Aminopropyltrimethoxysilane
C = N-2-Aminoethyl-3-aminopropyltrimethoxysilane
D = DYNASYLAN ® TRIAMO
***TM = Toothed-disc mill
AJ = Air-jet mill Physicochemical Data of the Surface-Modified and Structurally Modified Silicas

| Example | BET specific surface area [m²/g] | Tapped density [g/l] | Loss on drying [%] | Loss on ignition [%] | pH | C content [%] |
|---|---|---|---|---|---|---|
| Comparative example | 163 | 51 | 1.7 | 4.3 | 9.8 | 2.5 |
| 1 | 173 | 165 | 1.1 | 6.6 | 7.2 | 4.0 |
| 2 | 167 | 188 | 1.5 | 8.8 | 6.9 | 4.8 |
| 3 | 163 | 189 | 1.6 | 4.0 | 9.6 | 2.4 |
| 4 | 173 | 169 | 0.8 | 3.5 | 9.7 | 1.5 |
| 5 | 162 | 191 | 0.5 | 4.4 | 9.9 | 2.9 |
| 6 | 129 | 148 | 0.8 | 4.6 | 6.8 | 3.0 |
| 7 | 261 | 178 | 1.6 | 6.1 | 10.0 | 3.4 |
| 8 | 163 | 55 | 1.8 | 4.4 | 9.6 | 2.4 |
| 9 | 171 | 66 | 0.8 | 3.4 | 9.6 | 1.5 |
| 10 | 131 | 71 | 0.8 | 4.6 | 6.8 | 2.9 |
| 11 | 261 | 49 | 1.9 | 6.5 | 10.0 | 3.5 |

A. Incorporation Characteristics:

TABLE

Incorporation characteristics in Palatal 410

| Silica | Incorporation time [sec.] |
|---|---|
| Comparative example | 196 |
| Example 3 | 58 |
| Example as per EP 0 808 880 | 125 |

The inventive silica of Example 3 can be incorporated very rapidly, within 58 seconds, into Palatal A 410. The comparative example, in contrast, requires a time of 196 seconds for complete incorporation. The result is a time saving of approximately 30%.

Procedure:

100 g of Palatal A 410 are weighed out into a 350 ml beaker and conditioned to 25° C. in a water bath. The beaker is inserted into the aluminium insert of the mounting device of the dissolver. The stirrer is immersed to the target depth of d=10 mm above the base of the beaker, and switched on at a speed n of 500 min⁻¹. 3 g of silica are applied uniformly to the resin surface, and the stopwatch is started. A measurement is made of the time required for the silica to be homogenized in the resin.

B. Rheological Properties:

TABLE

Rheological properties in epoxy resin Renlam M1

| Silica | Viscosity [mPas] 2.5 rpm | Viscosity [mPas] 20 rpm | Initial mass [g]/% by weight |
|---|---|---|---|
| Comparative example | 88 000 | 48 600 | 10/5.6 |
| Comparative example | 195 200 | 134 400 | 16/8.7 |
| Example 3 | 3200 | 3800 | 10/5.6 |
| Example 3 | 33 600 | 46 000 | 45/40.0 |
| Example as per EP 0 808 880 | 60 800 | 16 200 | 10/5.6 |

With the same initial mass of 10 g as the comparative example, the inventive silica of Example 3 exhibits a viscosity reduced by about 96% at 2.5 rpm and reduced by about 92% at 20 rpm. The maximum initial mass in the case of the comparative example was 16 g (8.7% by weight), whereas in the case of the inventive silica from Example 3 it was possible to weigh out 45 g (40% by weight), the viscosity still always being lower than in the comparative example with the same initial mass.

Procedure:

A 350 ml beaker is charged with 167.5 g of Renlam M-1 and 10 g of silica and the dissolver disc is immersed fully. The silica is then homogenized (incorporated) at a speed n1 of 1000 min⁻¹, with the lid closed. As soon as the silica is fully incorporated, the speed is raised to n2=3000 min⁻¹ and dispersion is carried out for 3 minutes under vacuum. The viscosity is determined using a Brookfield DV III rheometer.

The invention claimed is:

1. An epoxy resin comprising fumed silica which is modified on the surface with at least one organoaminosilane of the group of aminopropyltriethoxysilane, aminopropyltrimethoxysilane, N-(2-aminoethyl)-3-aminopropylmethyldimethoxysilane and 3-aminopropylmethyldiethoxysilane, wherein the fumed silica is further structurally modified by ball milling and optionally by grinding and the fumed silica has a BET surface area of 200±25 m²/g.

2. A process for preparing the epoxy resin of claim 1, comprising optionally spraying the silica with water and combining the fumed silica with the surface modifier, which is at least one organoaminosilane of the group of aminopropyltriethoxysilane, aminopropyltrimethoxysilane, N-(2-aminoethyl)-3-aminopropylmethyldimethoxysilane and 3-aminopropylmethyldiethoxysilane, thermally treating the combination at a temperature of 20 to 400° C. over a period of 0.1 to 6 hours, structurally modifying by ball milling and optionally by grinding and incorporating the surface-modified fumed silica into an epoxy resin and the fumed silica has a BET surface area of 200±25 m²/g.

3. A process for preparing the epoxy resin of claim 1 comprising mixing the fumed silica with the surface modifier, which is at least one organoaminosilane of the group of aminopropyltriethoxysilane, aminopropyltrimethoxysilane, N-(2-aminoethyl)-3-aminopropylmethyldimethoxysilane and 3-aminopropylmethyldiethoxysilane, in vapour form, subjecting the mixture to a temperature of 50 to 800° C. for a period of 0.1 to 6 hours, structurally modifying by ball milling and optionally by grinding and incorporating the surface-modified fumed silica into an epoxy resin.

4. An adhesive, comprising at least one member selected from the group consisting of an epoxy resin, an unsaturated polyester resin, a polyurethane, a silane-terminated polymer, a vinyl ester resin, an acrylate, polyvinyl acetate, polyvinyl alcohol, polyvinyl ether, ethylene-vinyl acetate, an ethylene-acrylic acid copolymer, polystyrene, styrene-butadiene rubber, chloroprene rubber, nitrile rubber, butyl rubber, polysulfide, polyethylene, polypropylene, fluorinated hydrocarbon, polyamide, saturated polyester, saturated copolyester, phenol-formaldehyde resin, cresol-/resorcinol-formaldehyde resin, urea-formaldehyde resin, melamine-formaldhyde resin, polyimide, polybenzimidazole, and polysulphone; and fumed silica which is further modified on the surface with at least one organoaminosilane of the group of aminopropyltriethoxysilane, aminopropyltrimethoxysilane, N-(2-aminoethyl)-3-aminopropylmethyldimethoxysilane and 3-aminopropylmethyldiethoxysilane, wherein the fumed silica is further structurally modified by ball milling and optionally by grinding and the fumed silica has a BET surface area of 200±25 $m^2/g$.

5. The adhesive of claim 4, wherein the fumed silica which is modified on the surface with at least one organoaminosilane of the group of aminopropyltriethoxysilane, aminopropyltrimethoxysilane, N-(2-aminoethyl)-3-aminopropylmethyldimethoxysilane and 3-aminopropylmethyldiethoxysilane, and which is further structurally modified is present in an amount of up to 40% by weight, based on the total mass.

* * * * *